(12) United States Patent
Gambuzzi et al.

(10) Patent No.: US 12,113,423 B2
(45) Date of Patent: Oct. 8, 2024

(54) ELECTRIC MOTOR WITH INTEGRATED PUMP

(71) Applicant: Dana Motion Systems Italia S.R.L., Reggio Emilia (IT)

(72) Inventors: David Gambuzzi, Reggio Emilia (IT); Luca Buscicchio, Modena (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 217 days.

(21) Appl. No.: 17/651,050

(22) Filed: Feb. 14, 2022

(65) Prior Publication Data

US 2023/0258176 A1   Aug. 17, 2023

(51) Int. Cl.
| | |
|---|---|
| *H02K 5/18* | (2006.01) |
| *F04C 2/08* | (2006.01) |
| *F04C 15/00* | (2006.01) |
| *F15B 15/18* | (2006.01) |
| *H02K 5/04* | (2006.01) |
| *H02K 9/19* | (2006.01) |

(52) U.S. Cl.
CPC ............... *H02K 5/18* (2013.01); *F04C 2/084* (2013.01); *F04C 15/0096* (2013.01); *F15B 15/18* (2013.01); *H02K 5/04* (2013.01); *F04C 2240/30* (2013.01); *F04C 2240/40* (2013.01); *F05C 2201/021* (2013.01)

(58) Field of Classification Search
CPC ............... H02K 5/18; H02K 5/04; H02K 9/19
USPC ............................................ 310/62, 63, 89
See application file for complete search history.

(56) References Cited

U.S. PATENT DOCUMENTS

| 8,970,075 B2 | 3/2015 | Rippel et al. |
| 10,284,047 B2 | 5/2019 | Fritts et al. |
| 2020/0350796 A1 | 11/2020 | Yang et al. |

FOREIGN PATENT DOCUMENTS

| CA | 2546753 A1 | * 11/2006 | ............... F04C 14/18 |
| CN | 201433891 | * 3/2010 | |
| EP | 2921703 A2 | * 9/2015 | ............ F01C 21/108 |
| EP | 3279476 A1 | * 2/2018 | ............ E20F 9/2095 |
| JP | 05240146 A | * 9/1993 | |
| JP | 2007138797 A | * 6/2007 | |
| JP | 2008267236 A | * 11/2008 | |
| JP | 2013167162 A | * 8/2013 | |
| NL | 2028698 B1 | * 1/2023 | |
| WO | 2005057757 A1 | 6/2005 | |
| WO | WO-2020128081 A1 | * 6/2020 | ............ B60T 13/588 |
| WO | WO-2021115524 A1 | * 6/2021 | ............ F01C 21/104 |

* cited by examiner

*Primary Examiner* — Jose A Gonzalez Quinones
(74) *Attorney, Agent, or Firm* — McCoy Russell LLP

(57) ABSTRACT

A system is disclosed including an electric motor having a rotor shaft, a hydraulic pump including a gear; and an end bell housing enclosing an end of the electric motor, the end housing having a plurality of cooling fins, the end housing further supporting the gear coupled to the rotor shaft, the gear pressurizing hydraulic fluid.

19 Claims, 6 Drawing Sheets

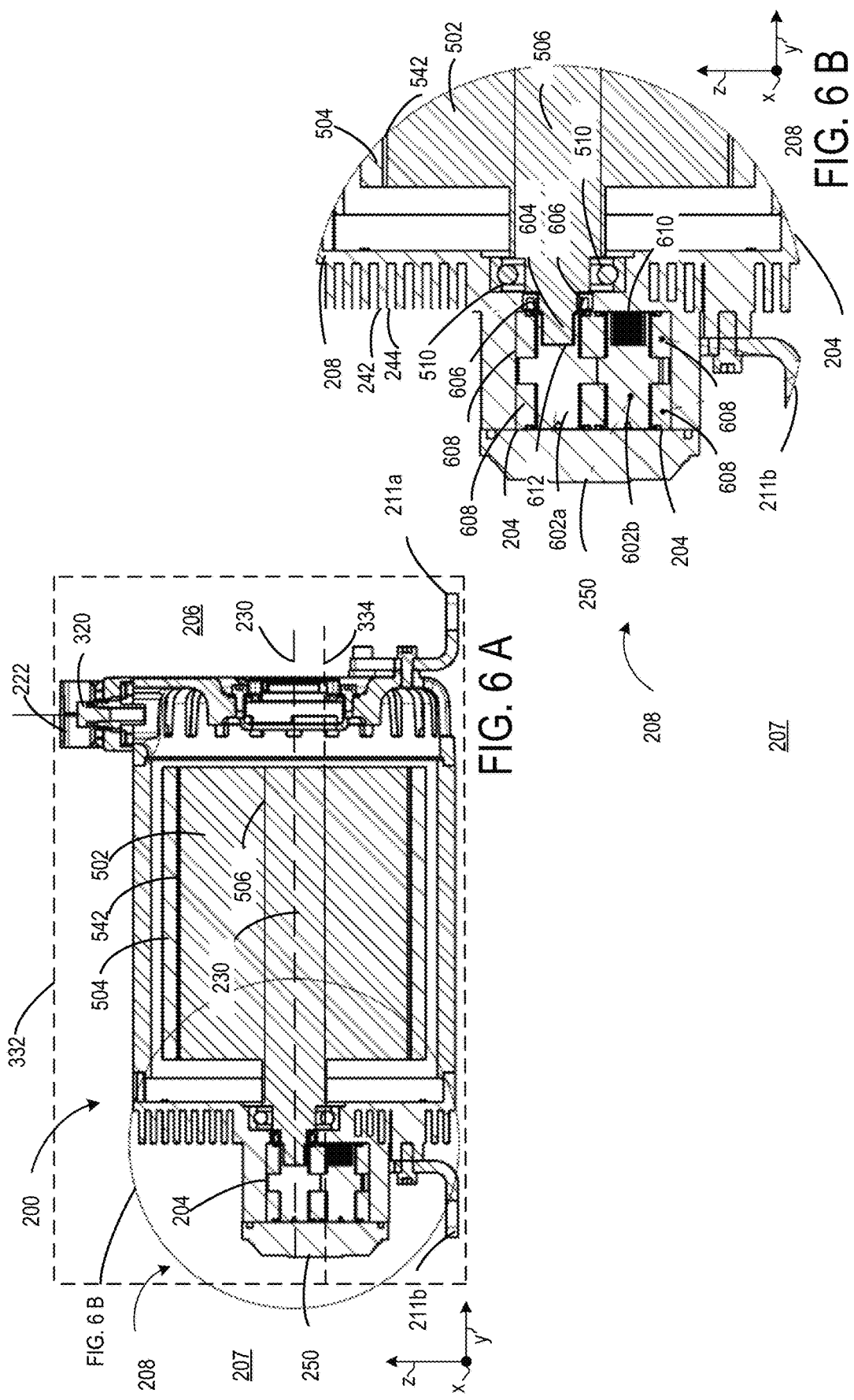

ELECTRIC MOTOR WITH INTEGRATED PUMP

TECHNICAL FIELD

The present description relates generally to an electric motor with an integrated pump, and a housing therefore.

BACKGROUND AND SUMMARY

An electric motor may be used to convert electrical energy into mechanical energy efficiently to drive an external pump through gears, such as for a hydraulic system. In applications, such as stationary industrial machinery, industrial vehicles, etc., a volume of the electric motor and pump may be limited. At the same time, there may be certain coupling locations that are required for elements, such as hydraulic hoses, pipes, or other forms of lines. These locations, and the lines themselves and related clearance and anti-kink issues, may pose constraints on the volume and space available for the motor and pump. Moreover, many systems equipped with an electric motor and pump may have thermal constraints. Thermal issues may also affect the available volume, and spacing requirements, around the motor and pump.

In one example, the issues described above may be addressed by a system, comprising: an electric motor having a rotor shaft; a hydraulic pump including a gear; and an end bell housing enclosing an end of the electric motor, the end housing having a plurality of cooling fins, the end housing further supporting the gear coupled to the rotor shaft, the gear pressurizing hydraulic fluid. In this way, it is possible to provide a more compact arrangement while still enabling heat dissipation and access for hydraulic or other lines.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 6A shows a cross sectional view of the electric motor with the gear pump illustrated in FIGS. 2-5 from the vertical mid-plane in FIG. 3 and FIG. 4 and intersecting the motor and gear pump.

FIG. 6B shows an enlarged view of the cross section of the electric motor with the gear pump illustrated in FIG. 6A including the gear pump, a bellhousing, and the connection of the bellhousing to the electric motor.

DETAILED DESCRIPTION

Figure 1:
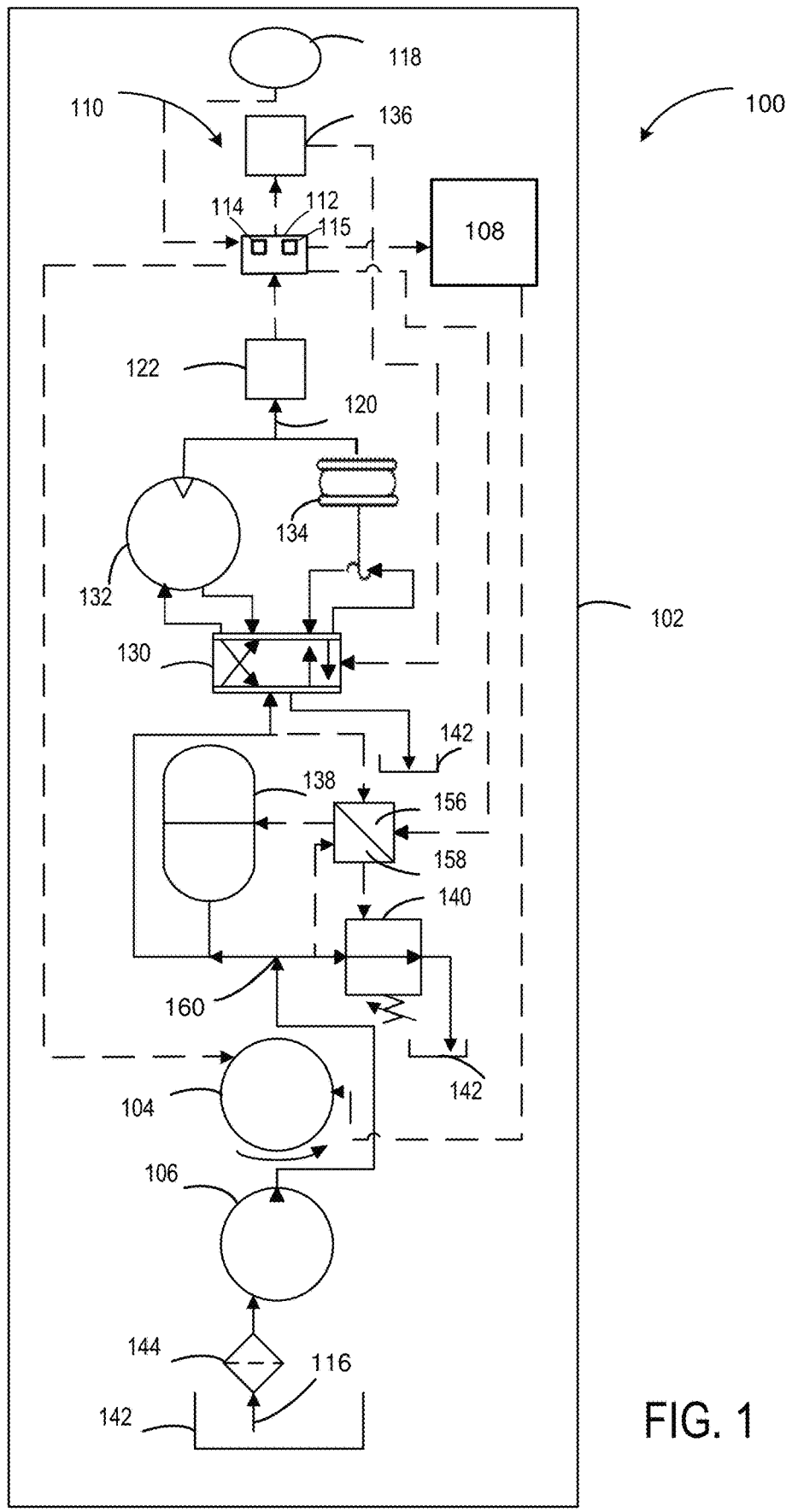
FIG. 1 shows a schematic representation of a hydraulic circuit in a vehicle, including an electric motor with a gear pump.
Figure 2:
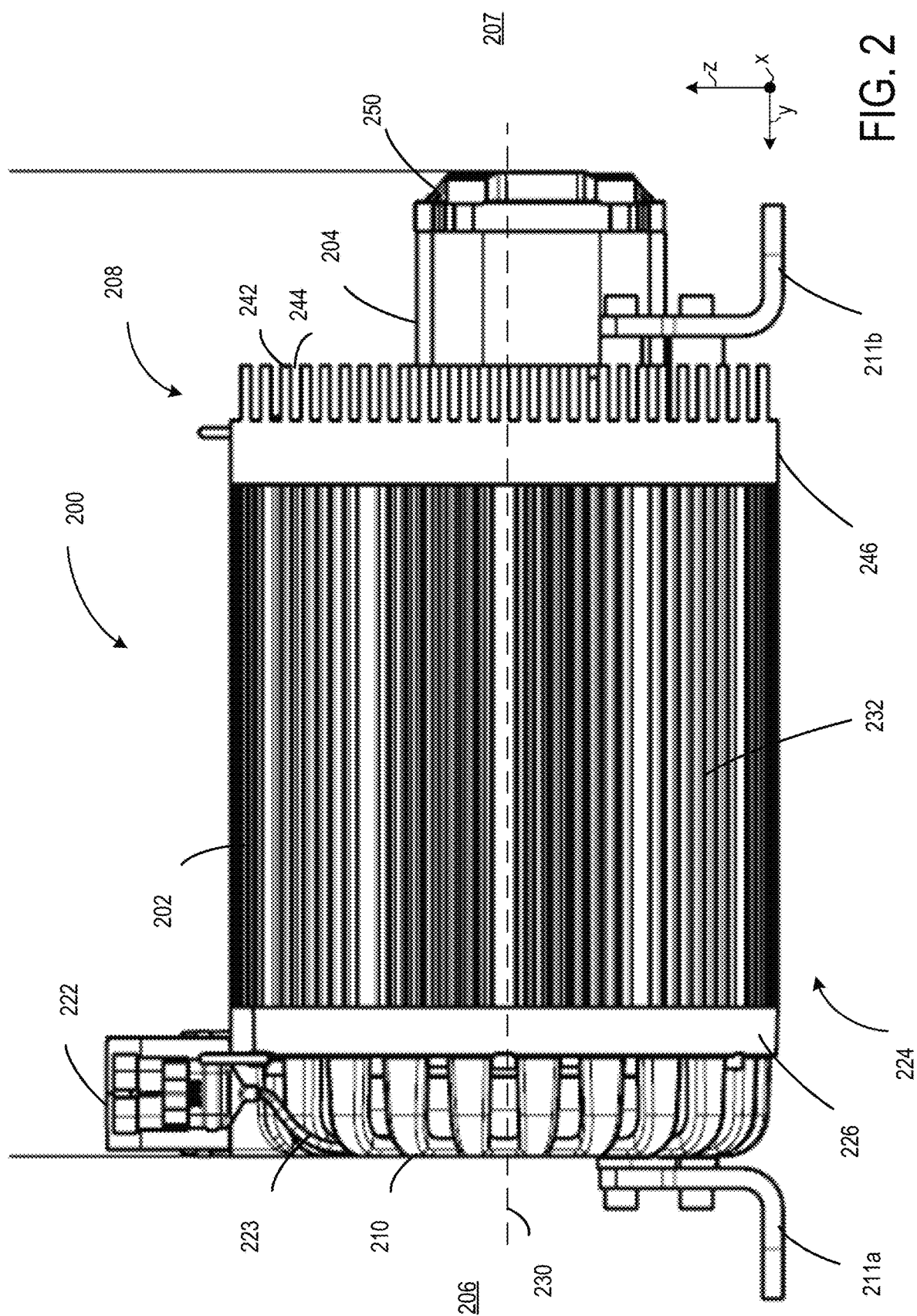
FIG. 2 shows a side view of the electric motor with the gear pump described in the hydraulic circuit of FIG. 1 integrated into a single housing unit.
Figure 3:
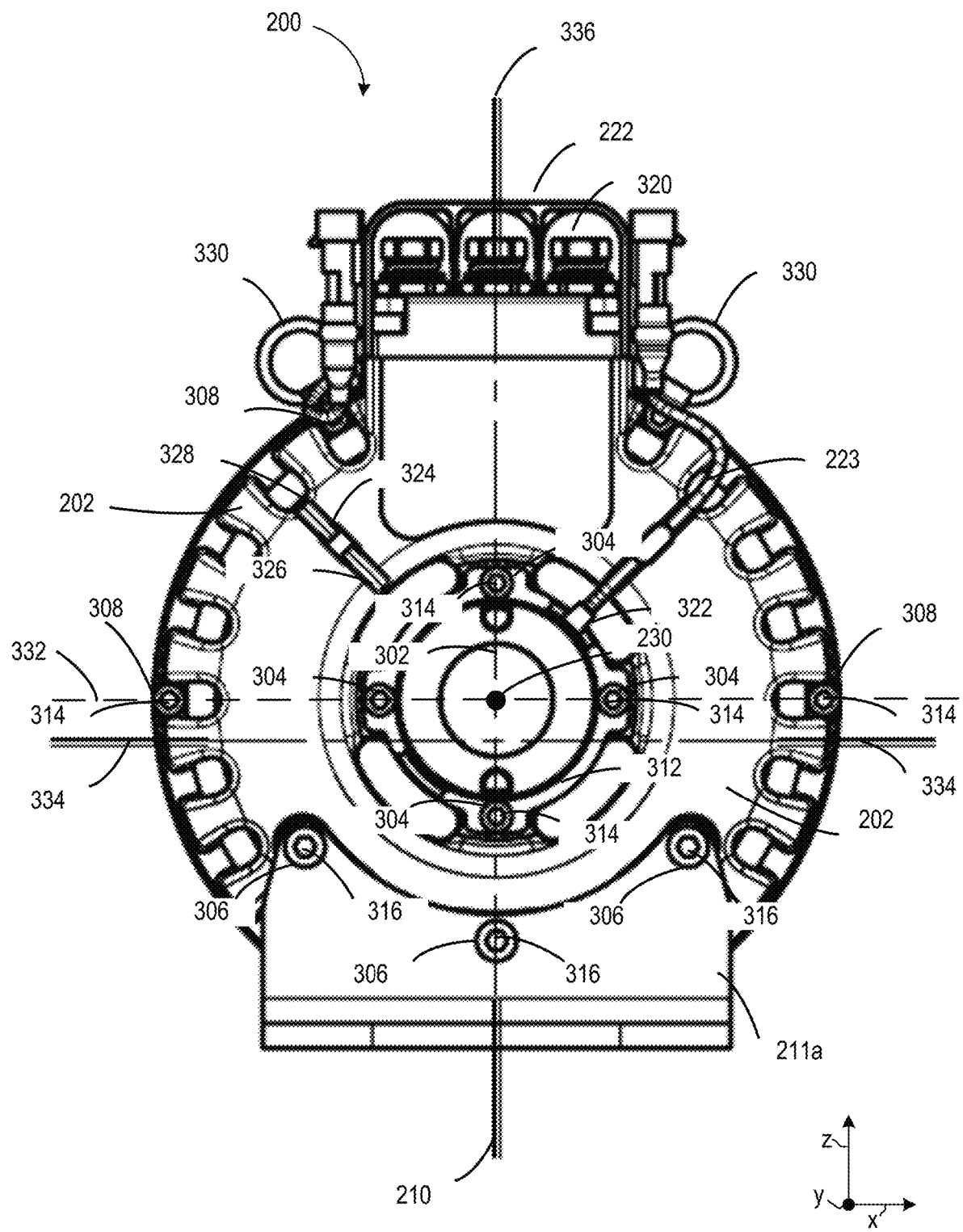
FIG. 3 shows a side view of the electric motor with a gear pump of FIG. 2, illustrating the electrically powered lead side.
Figure 4:
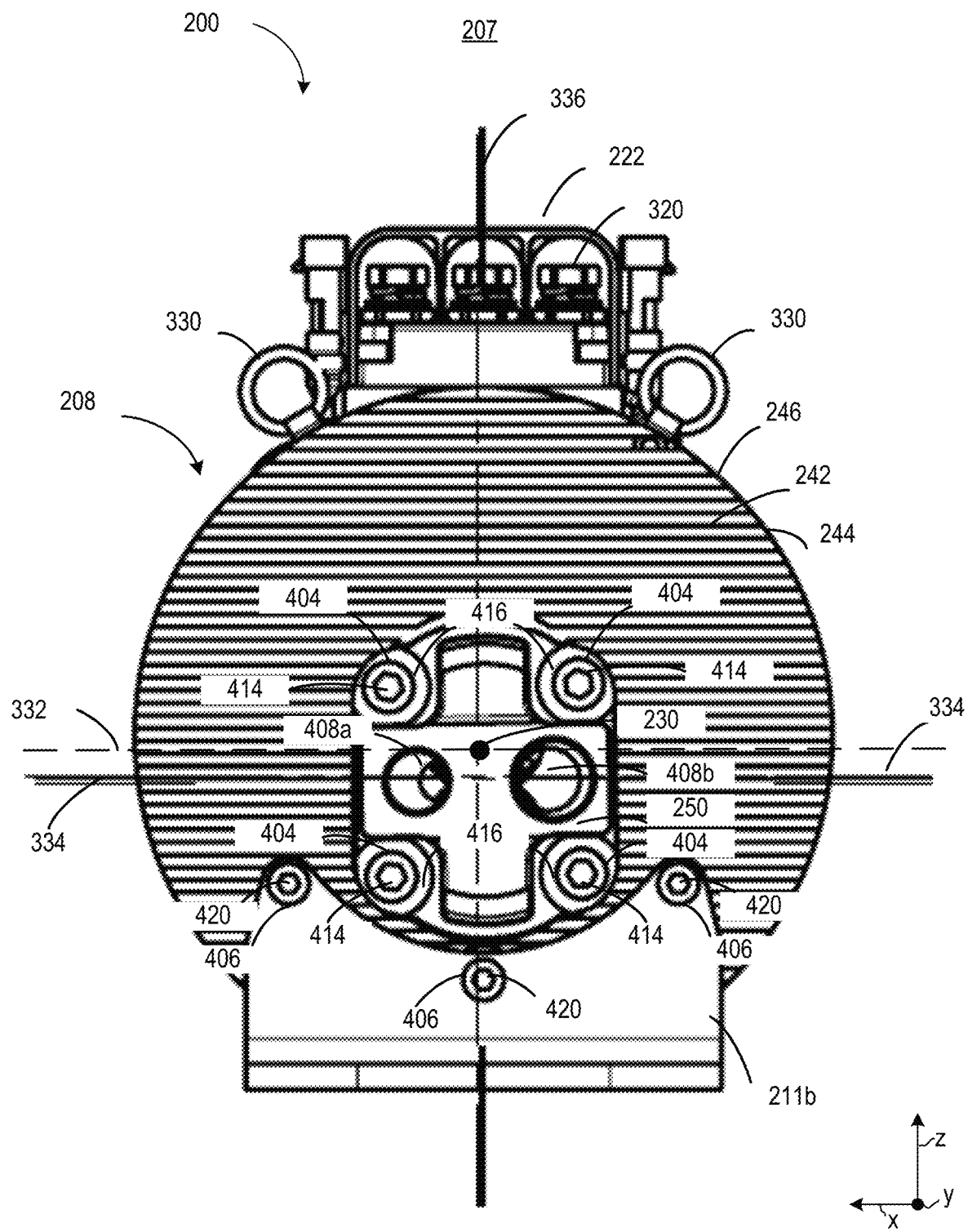
FIG. 4 shows a side view of the electric motor with the gear pump of FIG. 2, illustrating the pump side and ports.
Figure 5:
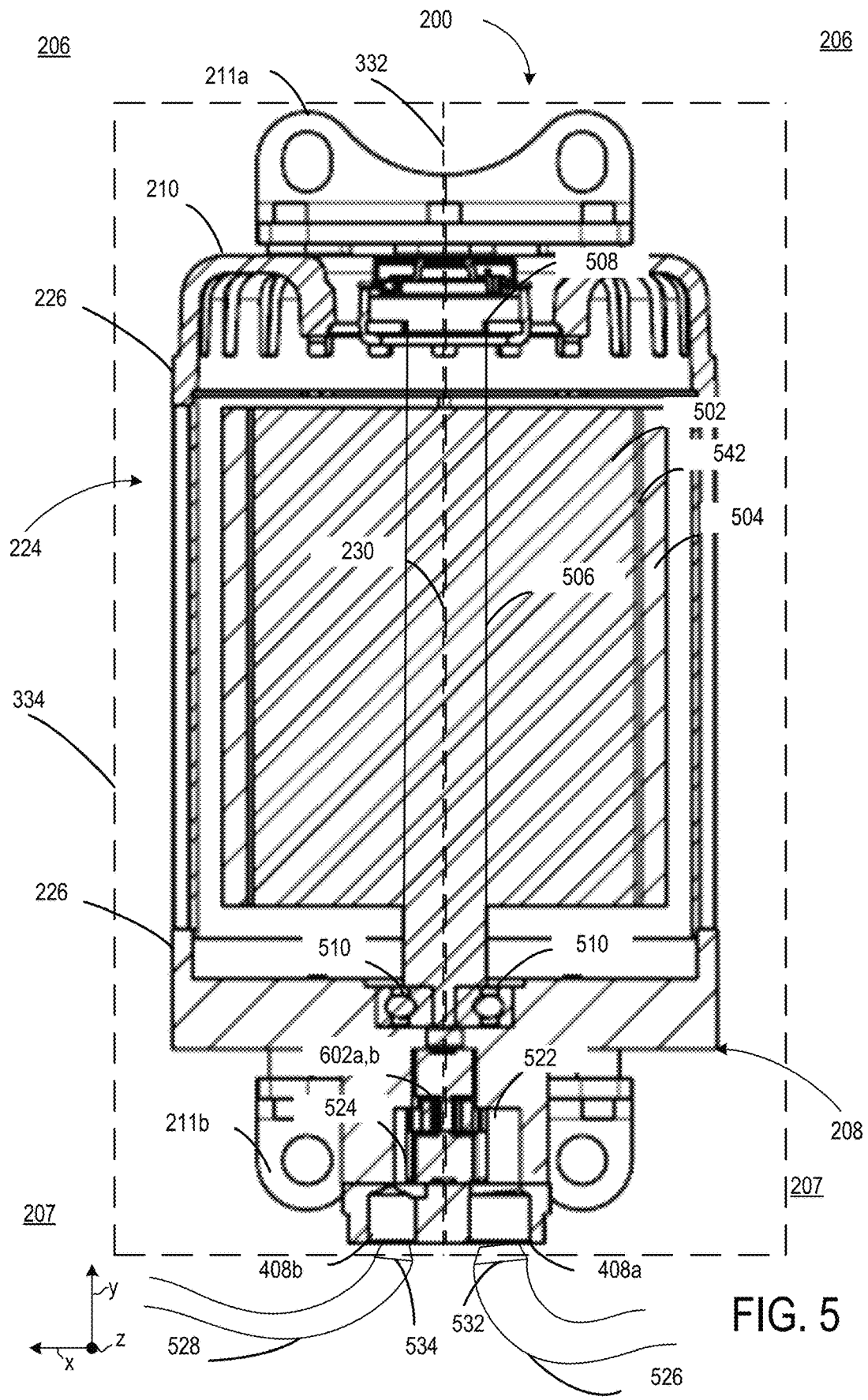
FIG. 5 shows a cross sectional view of the electric motor with the gear pump illustrated in FIGS. 2-4 from the longitudinal plane in FIG. 3 and FIG. 4 and intersecting the hydraulic ports, the electric motor, and gear pump.

FIG. 1 schematically illustrates a hydraulic circuit incorporating a motor and gear pump into the hydraulic system of a wheeled vehicle. FIG. 2 shows an exterior view along the x-axis of the motor and gear pump which may be used in FIG. 1. FIG. 3 shows a view along the y-axis or axis of rotation of the of the motor and gear pump of FIG. 2 from the lead-side. FIG. 4 shows a view along the y-axis or axis of rotation of the of the motor and gear pump of FIG. 2 from the pump side. FIG. 5 show a cutout of the interior of the motor and gear pump of FIG. 2, including the channels of the gear pump and hydraulic tubing, along the z-axis onto a longitudinal plane previously shown in FIG. 3-4. FIG. 6A shows a cutout of the interior of the motor and gear pump of FIG. 2, including the channels of the gear pump and hydraulic tubing, along the x-axis onto a vertical plane previously shown in FIG. 3-4. FIG. 6B shows a detailed view of the gear pump cutout showing in FIG. 6A.

The x-axis may be referred to as a lateral axis, the z-axis may be referred to as a vertical axis, and the y-axis may be referred to as a longitudinal axis. In this example, the y-axis is aligned with a central axis of rotation of the electric motor, gears, and pump.

As described herein, in an example, a motor and pump are housed in a single housing unit. The housing may be positioned in a vehicle or a stationary machine to power and adjust conditions in hydraulic systems. The pump operates to pressurize and direct hydraulic fluid through a hydraulic circuit. The pump may be a gear pump with a pair of gears, where the meshing of the gears acts to pump fluid by displacement. The pressurized hydraulic fluid may then drive hydraulic motors and/or other actuators.

In an example, an end bell housing encloses both the motor and the pump. Further, the end housing may also enclose one or more gears forming the pump, with one of the gears directly coupled to and driven directly by the rotor shaft of the motor. Such a configuration may provide several advantages. For example, the configuration may provide a reduction in longitudinal length thus enabling reduced packaging space while maintaining a reduced width. Further, such a configuration may enable the bell housing to act as a heat sink even though positioned near the pump. Further, such a configuration may enable positioning of hydraulic ports and channels in a way that promotes longitudinally alignment (e.g., a line parallel with or the y may be normal to the cross sectional area of the ports and channels). The longitudinally aligned ports can connect to hydraulic lines that are also longitudinally aligned.

In an example, the pump may be further closed by a flange that includes ports for coupling with hydraulic lines. More volumetric space surrounding the width of the electric motor and gear pump may thus be available for alternative use. Such a configuration can also accommodate longitudinally aligned hydraulic ports to further reduce space where a connection between the rotor shaft and upper gear of the gear pump may be reduced in longitudinal length (e.g., length in the y direction.).

FIG. 1 schematically illustrates a hydraulic circuit 100 in a vehicle 102. The example hydraulic system in FIG. 1 includes two hydraulic actuators to demonstrate how the motor and pump of FIGS. 2-6 drive the hydraulic system. However, in other examples, a fewer or greater number of hydraulic actuators may be provided. The vehicle 102 may take a variety of forms in different embodiments such as a light, medium, or heavy duty vehicle, such as a fork lift or dump truck or on-highway vehicle. The hydraulic circuit 100 and an electric motor 104 (e.g., 202 in FIG. 2) and gear pump (e.g., 204 in FIG. 2) may be designed for industrial applications requiring hydraulics. In an alternative embodiment, the system may be of a stationary power unit.

FIG. 1 shows the hydraulic circuit 100 may be powered and hydraulic fluid 116 may be pressurized by an electric motor 104 acting through a pump 106, for this example a gear pump (e.g., 204 in FIG. 2), as will be elaborated herein, particularly with regards to FIGS. 2-6B. The hydraulic circuit 100, the electric motor 104, and the vehicle 102 may be powered by a prime mover 108 (e.g., an internal combustion engine, an electric motor-generator, a battery, or a combination thereof). The prime mover 108 acts as a power/electricity source for the electric motor 104.

FIG. 1 shows the vehicle 102 and the hydraulic circuit 100 may further include a control system 110. FIG. 1 shows the control system 110 includes a hydraulic controller 112. The hydraulic controller 112 may include a processor 114 and a memory 115 with instructions stored therein that, when executed by the processor 114, cause the hydraulic controller 112 to perform various methods, control techniques, etc. described herein.

The control system 110 and hydraulic controller 112 receives and adjusts conditions in the circuit input from a reference signal 118 and recorded pressure loads 120. The reference signal 118 is a machine readable signal that instructs the hydraulic controller 112 what the desired stead state conditions for the hydraulic system may be set too. Pressure loads 120 may be recorded by an actuator pressure sensor 122, such as a transducer. The pressure loads 120 may be the pressures generated by the hydraulic actuators 132, 134.

The control system 110 may be used to change a plurality of conditions in the hydraulic circuit 100 and vehicle 102, including the pressure of a hydraulic fluid 116. Some components acted on by the controller may be used for increasing the pressure of the hydraulic fluid 116, such as the electric motor 104 and the pump 106. Some components acted on by the controller may be directly involved in actuation, such as an electrohydraulic valve 130, a hydraulic motor 132, and a hydraulic piston 134. Other components may be used for maintaining the pressure of the hydraulic fluid 116 at steady state between the pump 106 and hydraulic actuators 132, 134. Other pressure maintenance components may include an accumulator 138 and pressure release valve 140.

The hydraulic controller 112 may also control the output from the prime mover 108 to the electric motor 104, the electric motor 104 conditions, and an electrohydraulic valve 130. A servo-valve amplifier 136 is responsible for converting signals from the hydraulic controller 112 to have higher amplitude and energy to change conditions of the electrohydraulic valve 130.

For one example, conditions for the electrohydraulic valve 130 may include which plurality of valve ports are open, partially open, or closed. For one example, if the valve port of an electrohydraulic valve 130 is open or partially open, the hydraulic controller 112 may change how much area of the port is open to flow of the hydraulic fluid 116.

FIG. 1 shows an electrohydraulic valve 130 connected to hydraulic actuators 132, 134. An electrohydraulic valve 130 in conjunction with the control system 110 may responsible for adjusting flowrate in and out of the hydraulic actuators 132, 134. The first hydraulic actuator is a hydraulic motor 132. The second hydraulic actuator is a hydraulic piston 134. In other examples, however, the vehicle 102 and hydraulic circuit 100 may use other forms of hydraulic actuators 132, 134 besides those shown in FIG. 1. Other examples of hydraulic actuators 132, 134 have been contemplated and considered.

FIG. 1 shows a sump 142 connected to a filter 144 and by extension a pump 106. The sump 142 acts as a reservoir for hydraulic fluid 116. Hydraulic fluid 116 may be drawn from the sump 142 into the filter 144 by pressure generated by the pump 106. The pump 106—for this example a gear pump (e.g., 204 in FIG. 2)—may be used to increase or decreases the pressure of the hydraulic fluid 116. The pump 106 may be coupled to an electric motor 104 and housed in a single unit (e.g., the motor and pump unit 200 in FIG. 2). The electric motor 104 may be used to power the pump 106.

FIG. 1 also shows an example of an accumulator 138 and a pressure release valve 140. The accumulator 138 and pressure release valve 140 are further used for adjusting the pressure of the hydraulic fluid 116 and hydraulic circuit 100. For this example, a single or plurality of accumulator pressure sensors 156 may be used to detect and record the pressure at points before and/or after the accumulator 138. For this example, a separate accumulator controller 158 may be used to change the conditions in the accumulator 138 and the pressure release valve 140. FIG. 1, for example shows an accumulator controller 158. For this example, the accumulator controller 158 makes decisions based data from the accumulator pressure sensors 156 and the pressure set point of the hydraulic controller 112. In other examples, however, the vehicle 102 may use other devices to control the pressure of the accumulator 138 besides those shown in FIG. 1. For another example, the hydraulic controller 112 may be used as the sole controller and in place of the accumulator controller 158. Other examples of controller and sensor systems have been contemplated and considered.

For one example, the hydraulic fluid 116 may be oil or another form of fluid drawn from a sump 142. The sump 142 functions as reservoir basin for the hydraulic fluid 116 used in hydraulic circuit 100 of the vehicle 102. Before entering the pump, the hydraulic fluid 116 passes through a filter 144 to remove any particulates or other contaminants that could degrade or clog the components of the pump 106. After the hydraulic fluid 116 is filtered by the filter 144, the hydraulic fluid 116 may enter the pump 106.

For this example, inside the pump 106, the mechanical energy generated by the electric motor 104 is transferred into the fluid actuators (e.g., gears) of the pump 106 and then transferred to the hydraulic fluid 116. The mechanical energy increases the volumetric flowrate of the hydraulic fluid 116. Increase in flowrate of the hydraulic fluid 116 through a more confined exit channel increases the pressure of the hydraulic fluid 116 upon exiting the pump 106.

For one example, the hydraulic fluid 116 may leave the pump 106 moving through hydraulic lines toward the hydraulic actuators 132, 134. For this example, at a junction 160, the hydraulic fluid 116 reaches a split in the line. Hydraulic fluid 116 at the junction 160 may be pushed toward an accumulator 138 and or to pressure release valve 140.

The accumulator 138 is a hydraulic energy storage device that collects hydraulic fluid 116 in order to conserve pressure. For one example, if flow rate and/or pressure of the hydraulic fluid 116 decreases, the accumulator 138 may release hydraulic fluid 116 to maintain the desired pressure and flowrate near the electrohydraulic valve 130 until the pressure imbalance has been corrected.

The pressure release valve 140 is an energy removal and pressure reducing device. For another example, if flowrate and pressure of the hydraulic fluid 116 begin to increase beyond a desired level, the relief valve may syphon hydraulic fluid 116 from the line to reduce pressure of the hydraulic circuit 100. For this example, the pressure release valve 140 may continue to syphon hydraulic fluid 116 near the electrohydraulic valve 130 until the pressure imbalance has been corrected. The hydraulic fluid 116 syphoned through the pressure release valve 140 may be discharged back to the sump 142.

The motor and pump in FIGS. 2-6 are illustrated as an electric motor 104 and a pump 106 designed together as a single unit. In this example, a rear end bell of the motor integrates the gear pump 204 therewithin. In this example, a pump side bell is shaped and structured as an electric motor closing flange and supports the pump body. The pump is positioned inside bellhousing and is separate from, but coupled with, the motor via direct drive from the rotor. Such a configuration may enable a reduced motor packaging such as via a shorter length and/or narrower width. Reducing the size of a combined electric motor 104 and pump 106 for a hydraulic system may provide for a more efficient use of space. Narrowing the width of a hydraulic system may allow for a lithium ion battery or metal hydride bed to curve around the narrower components of the vehicle and provide additional volumes for housing. Additionally, reducing the volume of space in the motor, hydraulic pump, and hydraulic components allows for more volume to be used to vent and cool the power unit. For another example, narrowing the hydraulic components of stationary industrial equipment may allow for widened and larger volumes of human accessible spaces to be placed adjacent to equipment with a reduced width.

FIG. 2 shows a side view (looking along the x-axis) of the electric motor 202 with an integrated gear pump 204 that may be referred to as a motor and pump unit 200. The motor and pump unit 200 has a left side herein designated as the lead side 206 and the right side herein designated as a pump side 207. The motor and pump unit 200 includes a pump bellhousing 208, a lead side flange/bellhousing 210, and a generally cylindrical rotor/stator housing 224, which enclose the moving and electrified components of the electric motor 202. The pump bellhousing 208 and lead side flange/bellhousing 210 are shaped and structured to act as electric motor 202 and rotor/stator housing 224 closing flanges. The pump bellhousing 208 may also support the gear pump 204 as described herein. A lead side motor mount 211a is coupled to the motor and pump unit 200 by a plurality of lead side motor mounting apertures (e.g., 306 in FIG. 3). A pump side motor mount 211b may be coupled to the motor and pump unit 200 by a plurality of pump side motor mounting apertures (e.g., 406 in FIG. 4). The motor and pump unit 200 may be fastened to a vehicle (e.g., vehicle 102 of FIG. 1) with the lead side motor mount 211a and pump side motor mount 211b.

FIG. 2 shows the lead side flange/bellhousing 210 located on the lead side 206 of the motor and pump unit 200. The lead side flange/bellhousing 210 is an end cap enclosing electrical components of the electric motor 202 and the lead side 206 of the shaft (e.g., 302 in FIG. 3). The top portion of the lead side flange/bellhousing 210 includes three phase bus bar housing 222 for the three phase bus bar (e.g., 320 in FIG. 3). The three phase bus bar (e.g., 320 in FIG. 3) supplies electricity for the motor and pump unit 200. Leaving the three phase bus bar housing 222 is an external power wire 223 that transfers electricity from the three phase bus bar (e.g., 320 in FIG. 3) to the electric motor 202. The lead side flange/bellhousing 210 is coupled with the lead side 206 lead side motor mount 211a. While this example illustrates a three-phase motor, a single phase motor may also be used and/or a DC motor may be used.

FIG. 2 shows the lead side flange/bellhousing 210 is coupled to, encloses, and acts as a flange supporting the rotor/stator housing 224. In the present example, the lead side flange/bellhousing 210 is coupled to the rotor/stator housing 224 on a rim facing the lead side 206. The rim facing the lead side 206 is coupled to and surrounded by an outer lead side flange section 226 of the lead side flange/bellhousing 210. The lead side flange/bellhousing 210 is coupled to the longitudinally aligned surface (not shown) (wherein axes parallel to the y axis and axis of rotation would intersect the surface at a 90° or 180° angle) and encloses a rim facing the lead side 206 beneath the outer lead side flange section 226 of the lead side flange/bellhousing 210. The lead side flange/bellhousing 210 is coupled to the rotor/stator housing 224 using lead side housing coupling apertures (e.g., 308 in FIG. 3). For one example, the outer lead side flange section 226 may be the sole coupling between the lead side flange/bellhousing 210 and rotor/stator housing 224. For other embodiments, there may be additional couplings between the lead side flange/bellhousing 210 and rotor/stator housing 224.

An axis of rotation 230 of the motor extends along the length in the y-direction of the motor and pump unit 200. The axis of rotation 230 is located nominally in the center and concentric to rotor/stator housing 224. The axis of rotation 230 is the axis that the rotor (e.g. 502 in FIG. 5) rotates around when the electric motor 202 is running. The rotor/stator housing 224 extends from a bellhousing rim on the lead side 206 beneath the outer lead side flange section 226, along the axis of rotation 230 and length of the electric motor 202, to a bellhousing rim on the pump side 207. The rim facing the pump side 207 of the rotor/stator housing 224 is coupled to and surrounded by a pump side flange section 246 of the pump bellhousing 208. The surface of the rotor/stator housing 224 may be composed of radiator cooling fins 232 that extend along the length of the axis of rotation 230 (e.g., wherein the axis of rotation 230 or a line parallel to the axis of rotation 230 would be parallel to the length of the radiator fins). The rotor/stator housing radiator cooling fins 232 help transfer heat away from the electric motor 202 while in operation. The rotor/stator housing 224 and the rotor/stator housing radiator cooling fins 232 may be cast from a material with a high thermal exchange, such as aluminum. Materials of high thermal exchange may further aid in heat removal. The heat transfer provided by the rotor/stator housing radiator cooling fins 232 reduces likelihood of the electric motor 202 stalling due to overheating.

FIG. 2 shows the pump bellhousing 208 surrounding the entire circumference of the gear pump 204 around the axis of rotation 230. The pump bellhousing 208 may also enclose the pump and the bell side of the rotor/stator housing 224, and thus the pump bellhousing 208 acts as a closing flange. The pump side flange section 246 of the pump bellhousing 208 encloses and supports the rotor/stator housing 224. The pump side flange section 246 of the pump bellhousing 208 may aid in coupling the gear pump 204 to the electric motor 202. The pump side flange section 246 may be the sole coupling between the pump bellhousing 208 and rotor/stator housing 224. In alternatives, there may be additional couplings between the pump bellhousing 208 and rotor/stator housing 224.

FIG. 2 shows the pump bellhousing 208 includes a plurality of bellhousing radiator fins 242 on the pump side flange section 246 coupled to the rotor/stator housing 224. The bellhousing radiator fins 242 and gaps 244 therebetween run parallel with the x-axis (wherein the x-axis or a line parallel to the x-axis would be parallel to the length of the radiator fins). The bellhousing radiator fins 242 provide additional surface area for heat exchange. In this way, when mounted in a vehicle 102, airflow along the x-axis generated by motion of the vehicle 102 may provide increased airflow and thus heat transfer from the pump bellhousing 208 to the ambient air.

The pump bellhousing 208 including bellhousing radiator fins 242 may be cast from a material with a high thermal exchange, such as aluminum, to further aid in heat removal. The increased heat transfer and removal provided by the bellhousing radiator fins 242 and gaps 244 therebetween further reduces likelihood of the electric motor 202 stalling or degradation due to overheating. The increased heat transfer and removal provided by the bellhousing radiator fins 242 and gaps 244 therebetween further reduces likelihood of degradation from acute and/or gradual thermal deformation/temperature strain.

A pump flange 250 is fastened to the end of the pump bellhousing 208 and encloses the gear pump 204. For example, the pump flange 250 may enclose and secure the gear pump 204 in the pump bell housing. The pump flange 250 may be removed to conduct maintenance on the gear pump 204. The pump bellhousing 208 is also coupled with the pump side motor mount 211b. The pump bellhousing 208 and pump flange 250 may help protect the gear pump 204 from abrasions, the buildup of particulates, or other factors that may cause acute or chronic degradation. Both the pump flange 250 and pump bellhousing 208 help support the gear pump 204 in a stable position without requiring a plurality of couplings between the gear pump 204 and electric motor 202.

FIG. 3 shows a view from the lead side 206 of the electric motor 202 looking down the axis of rotation 230. The axis of rotation 230 extends down the shaft 302 of the electric motor 202. The axis of rotation 230 is the axis that the rotor (e.g. 502 in FIG. 5) rotates around. A shaft 302 is partially visible in the center of FIG. 3.

There may be three types of lead apertures used for mounting or coupling components onto the lead side flange/bellhousing 210. There may be a plurality of lead side motor mounting apertures 306 to couple the lead side motor mount 211a to the lead side flange/bellhousing 210. There may be a plurality of lead side motor coupling apertures 304 to couple the lead side flange/bellhousing 210 to the electric motor 202. There may be a plurality of lead side housing coupling apertures 308 to couple the lead side flange/bellhousing 210 to the rotor/stator housing 224.

FIG. 3 shows surrounding the shaft 302 are lead side motor coupling apertures 304. The lead side motor coupling apertures 304 couple the body of the electric motor 202 to the lead side flange/bellhousing 210 utilizing an end ring 312 and lead side bolts 314. FIG. 3 shows lead side bolts 314 may be located within the lead side motor coupling apertures 304. For an example in FIG. 2, the lead side bolts 314 may be threaded through the lead side motor coupling apertures 304, the end ring 312, the lead side flange/bellhousing 210, and into another set of apertures (not shown) in the body of the electric motor 202. Lead side bolts 314 and end ring 312 may couple lead side flange/bellhousing 210 to the electric motor 202. However, other methods of coupling the lead side flange/bellhousing 210 to the electric motor 202 exist, and have been contemplated. FIG. 3 shows the lead side motor mounting apertures 306 in the lead side motor mount 211a. The lead side motor mounting apertures 306 and lead side motor mount bolts 316 may be used to couple the lead side flange/bellhousing 210 and motor and pump unit 200 to the lead side motor mount 211a. For example, lead side motor mount bolts 316 may be threaded through the lead side motor mounting apertures 306 and additional apertures in the motor and pump unit 200. The lead side motor mount bolts 316 may couple the lead side flange/bellhousing 210 and motor and pump unit 200 to the lead side motor mount 211a. However, other methods of coupling the lead side flange/bellhousing 210 and motor and pump unit 200 to the lead side motor mount 211a exist, and have been contemplated.

FIG. 3 shows lead side housing coupling apertures 308. Lead side housing coupling apertures 308 and lead side bolts 314 may couple the lead side flange/bellhousing 210 to the rotor/stator housing 224. In the example, lead side bolts 314 are threaded through the lead side housing coupling apertures 308 and into another set of aligned apertures (not shown) in the rotor/stator housing 224. However, other methods of coupling the lead side flange/bellhousing 210 to the rotor/stator housing 224 exist, and have been contemplated.

FIG. 3 shows a cutout of the three phase bus bar housing 222. The cutout shows a three phase bus bar 320 within the three phase bus bar housing 222. FIG. 3 shows a more discernable view of the external power wire 223 as it descends from the three phase bus bar housing 222 and across the lead side flange/bellhousing 210. The three phase bus bar 320 transfers power to the external power wire 223 from an electrical source. The three phase bus bar 320 may also prevent a current from increasing above maximum threshold current that may be distributed to the external power wire 223. The three phase bus bar 320 may prevent high or high fluctuations in current from degrading the electrical components of the electric motor 202. The three phase bus bar 320 may also split the electrical supply into different circuits. The three phase bus bar 320 splits wiring into three separate phases to power three phases of windings within the stator (e.g., 504 in FIG. 5). For one example, the external power wire 223, may be composed of three phases that upon entry into the shaft 302 split to power different phases of windings. A cables from each phase may be threaded through the external power wire 223 and may be connected to the three phase bus bar 320 via a lug plus nut and bolt arrangement. However, other connections between the three phase bus bar 320 and external power wire 223 may be possible and have been considered.

The external power wire 223 connects into a port 322 in the end ring 312. The end ring port 322 couples the external power wire 223 to the electric motor 202, providing windings of the stator (e.g., 504 in FIG. 5) electricity to rotate the rotor (e.g., 502 in FIG. 5). The external power wire 223 may split into several cables of three separate phases that charge the different phases of windings within the stator (e.g., 504 in FIG. 5). A secondary wire 324 extends out from an exit port 326 and into an entry port 328 in the lead side flange/bellhousing 210. The secondary wire 324 is a grounding wire. On the top of the body of the motor and pump unit 200 may be a plurality of eye bolts 330. The eye bolts 330 may be used for securing tie rods, winch, and/or components so the motor and pump unit 200 may be lifted out of the vehicle 102 using a pulley.

The axis of rotation 230 is longitudinal, extending down the length of the electric motor 202. The axis of rotation 230 is the axis that the rotor (e.g., 502 in FIG. 5) rotates around when the electric motor 202 is in motion. A longitudinal midpoint plane 332 stretches across the center of FIG. 3 and encompasses the axis of rotation 230. The longitudinal midpoint plane 332 is parallel to the x-y plane, and divides motor. A longitudinal cross section plane 334 is parallel to the longitudinal midpoint plane 332. The longitudinal cross section plane 334 is lower in the z-axis compared to the longitudinal midpoint plane 332. The longitudinal cross section plane 334 is a mid-plane that is centered on the center point the hydraulic ports (e.g., 408a, 408b in FIG. 4).

A vertical midpoint plane 336 stretches down through the center of the motor. The axis of rotation 230 may be aligned with (e.g., located on and substantially parallel with the y-axis of) vertical midpoint plane 336 and encompasses the axis of rotation 230. The vertical midpoint plane 336 is located parallel to the y-z plane.

FIG. 4 shows a perspective of the motor and pump unit 200 from the pump side 207 looking down the axis of rotation 230. The axis of rotation 230 extends down the shaft 302 of the motor and pump unit 200.

FIG. 4 shows the pump flange 250 located near the center of the pump bellhousing 208. A center of the pump flange 250 may be nominally located at the intersection between the longitudinal cross section plane 334 and the vertical midpoint plane 336. In each of the corners of the pump flange 250 are a plurality of flange coupling apertures 404. The flange coupling apertures 404 enable coupling of the pump flange 250 to the pump bellhousing 208. Below the flange coupling apertures 404 are pump side motor mounting apertures 406. The pump side motor mounting apertures 406 may be responsible for coupling the pump bellhousing 208 and motor and pump unit 200 to the pump side motor mount 211b. FIG. 4 also shows an inlet hydraulic port 408a and an outlet hydraulic port 408b on the pump flange 250 and center of the pump bellhousing 208.

The flange coupling apertures 404 may be used with a plurality of pump side connectors, such as bolts 414. Washers 416 may be used to fasten the pump flange 250 to the gear pump 204 and pump bellhousing 208. Pump side bolts 414 may be threaded through the washers 416, the flange coupling apertures 404, and another set of apertures in the pump bellhousing 208. Once threaded the flange coupling apertures 404, pump side bolts 414, and washers 416 may couple the pump flange 250 and the pump bellhousing 208 together. However, other methods of coupling the pump flange 250 and the pump bellhousing 208 together may be used, such as welding, screws, and/or clips.

FIG. 4 shows a pair of hydraulic ports 408a, 408b on the pump flange 250. The ports include an inlet hydraulic port 408a and an outlet hydraulic port 408b. Hydraulic fluid 116 is pulled into the inlet hydraulic port 408a by the gear pump 204. Hydraulic fluid 116 exits the outlet hydraulic port 408b after being pressurized by the gear pump 204. The inlet hydraulic port 408a and outlet hydraulic port 408b are arranged to enable access for hydraulic lines that are then positioned away from radiating heat of the motor.

The pump bellhousing 208 also includes integrated hydraulic channels (e.g., 522 and 524 in FIG. 4) for hydraulic fluid 116 distribution. The shape of the pump bellhousing 208, gear pump 204, and pump flange 250, and hydraulic ports 408a, 408b may be designed so that fluid ducts (e.g., hydraulic channels 522 and 524 in FIG. 4) are sufficiently separated from the rest of the motor and pump unit 200. FIG. 4 shows the longitudinal cross section plane 334. The longitudinal cross section plane 334 divides the inlet hydraulic port 408a and outlet hydraulic port 408b.

FIG. 4, shows the pump side motor mounting apertures 406 in the pump side motor mount 211b. The pump side motor mounting apertures 406 couple the pump bellhousing 208 and gear pump 204 to the pump side motor mount 211b. For example, pump side motor mount bolts 420 may be threaded through pump side motor mounting apertures 406 and additional apertures in the motor and pump unit 200. The pump side motor mounting apertures 406 and pump side motor mount bolts 420 may couple the pump bellhousing 208 and motor and pump unit 200 to the pump side motor mount 211b. However, other methods of coupling the pump bellhousing 208 and motor and pump unit 200 to the pump side motor mount 211b exist, and may be used such as noted herein.

FIG. 5 is a cross-sectional view of the motor and pump unit 200. The cross section is cut from the longitudinal cross section plane 334 to display an interior of the motor and pump unit 200. FIG. 5 is top down view along the z-axis onto the longitudinal cross section plane 334.

FIG. 5 displays various components including the rotor 502, a stator 504, a rotor drive shaft 506, the lead side rotor shaft bearing 508, and a pump side rotor shaft bearing 510. The lead side flange/bellhousing 210 and rotor/stator housing 224 may enclose electrical components of the electric motor 202, such as the rotor drive shaft 506, the rotor 502, the stator 504, the windings within the stator, the lead side rotor shaft bearing 508, and the pump side rotor shaft bearing 510.

FIG. 5 also shows the interior of the gear pump 204. Within the interior of the pump are a hydraulic inlet channel 522 and a hydraulic outlet channel 524. An inlet hydraulic line 526 may be connected to the hydraulic inlet channel 522 through inlet hydraulic port 408a. The outlet hydraulic line 528 may be connected to the hydraulic outlet channel 524 through outlet hydraulic port 408b. The inlet hydraulic line 526 is fitted with an inlet nozzle 532 for the hydraulic inlet channel 522. The outlet hydraulic line 528 is fitted with an outlet nozzle 534 for the hydraulic outlet channel 524.

The interior of the electric motor 202 contains stator 504 and rotor 502, separated by a clearance cavity 542. The stator 504 is a fixed stationary component of the motor encircling the rotor 502. The rotor 502 extends out from the rotor drive shaft 506. The rotor 502 and rotor drive shaft 506 revolve around the axis of rotation 230 and are supported by the pump side rotor shaft bearing 510 and the lead side rotor shaft bearing 508.

The electric motor 202 may be a three phase alternating current (AC) motor. To produce mechanical energy from the electric motor 202 an alternating electrical current may be sent through the three phase bus bar 320 and split into three phases of current. The alternating current oscillates between a high positive current and a negative current much like a sine wave.

In an example, the shaft of the rotor (e.g., the rotor drive shaft 506) is directly integrated and interfaces with components of the gear pump 204, including one of the gears of the pump. In an example, the electric motor 202 and gear pump 204 are rotationally coupled via a direct coupling between a male coupling on the drive shaft of the rotor (e.g., the rotor drive shaft 506) of the electric motor 202 and a female coupling within the upper gear 602a of the gear pump 204. The motor may drive the gear pump 204 using the male coupling of the drive shaft of the electric motor 202 and female coupling part of the gear pump 204.

In an example, the phases of wiring may be threaded through and/or connected to the stator 504 via an external power wire 223. For this example, the external power wire 223 transfers current from the three phase bus bar 320 into the lead side flange/bellhousing 210 near the rotor drive shaft 506 of the electric motor 202. For this example, the phases of wiring may split upon entering the end ring port 322 to connect and provide electricity to different phases of windings of the stator 504. For this example, there may be six bundles of windings, each winding of the same phase is aligned with one another (e.g., a line perpendicular to each winding of a similar phase may be perpendicular to both). The copper wiring in the three phase bus bar housing 222, the external power wire 223, and the windings of the stator 504 may be enameled to prevent wires of the same and different phases from discharging current to one another.

The lead side rotor shaft bearing 508 and the pump side rotor shaft bearing 510 may be ring structures with a smooth outer bracing element and an inner roller element. The inner roller element may include small spheres or ball bearings lining the inner ring of the rotor shaft bearings 508, 510. The rotor shaft bearings 508, 510 encircle and support the rotor drive shaft 506 to reduce a likelihood of misalignment. The inner roller element allows the rotor drive shaft 506 to spin with reduced resistance as the stator 504 forces the rotor 502 to rotate.

When powered by the electric motor 202 and connected to the hydraulic lines 526, 528, the gear pump 204 may draw hydraulic fluid 116 into the hydraulic inlet channel 522 at a lower pressure and may flush hydraulic fluid 116 out of the hydraulic outlet channel 524 at a higher pressure. Hydraulic fluid 116 may be drawn into the hydraulic inlet channel 522 from the inlet hydraulic line 526. An inlet hydraulic line 526 may be connected to the hydraulic inlet channel 522 through an inlet hydraulic port 408a. An inlet nozzle 532 is fitted to the inlet hydraulic line 526. The inlet nozzle 532 may be used to couple and seal the inlet hydraulic line 526 to the inlet hydraulic port 408a. The gear pump 204 may drive hydraulic fluid 116 into the outlet hydraulic line 528. The outlet hydraulic line 528 connects to the hydraulic outlet channel 524 through the outlet hydraulic port 408b. An outlet nozzle 534 is fitted to the outlet hydraulic line 528. The outlet nozzle 534 may couple and seal the outlet hydraulic line 528 to the outlet hydraulic port 408b. The shape of pump bellhousing 208, pump flange 250, and the body of the gear pump 204 is designed so that a hydraulic inlet channel 522 and hydraulic outlet channel 524 are separated from interior surface of the pump bellhousing 208 and from the electric motor 202.

The hydraulic channels 522, 524 and hydraulic ports 408a, 408b may be designed to be separated from the pump bellhousing 208 and gear pump 204. The hydraulic channels 522, 524 and/or hydraulic ports 408a, 408b may be cast from a material of a lower thermal exchange. The design of the hydraulic channels 522, 524 and/or hydraulic ports 408a, 408b preserves hydraulic fluid 116 integrity and increases hydraulic performances of the example motor and pump unit 200. The hydraulic channels 522, 524 may be designed to maintain the hydraulic fluid 116 and fluid area at consistent temperature. In some embodiments, hydraulic channels 522, 524 may be designed to maintain the hydraulic fluid 116 and fluid area at a lower temperature than the pump bellhousing 208, gear pump 204, and the motor and pump unit 200.

For example, reduced heat transfer is desired to a hydraulic fluid 116 that may be sensitive to temperature change. For this example, configuring the hydraulic channels 522, 524 and hydraulic ports 408a, 408b to be separate and cast from a material of lower thermal exchange may maintain the hydraulic fluid 116 and fluid area at a lower temperature. For this example, other portions of the gear pump 204 may also be cast from a material of lower thermal exchange to maintain the hydraulic fluid 116 and fluid area at a lower temperature. Heat transfer from the motor and pump unit 200 to the hydraulic fluid 116 may be further reduced by the bellhousing radiator fins 242 of the pump side 207.

FIGS. 6A and 6B are side views of the motor and pump unit 200 displaying the vertical midpoint plane 336 in cross-section. The cross section is cut from the vertical midpoint plane 336 to display a side interior view of the gear pump 204. FIG. 6A and FIG. 6B are from the perspective looking along the x-axis and onto the vertical midpoint plane 336.

FIG. 6A is a cross-section of the motor and pump unit 200. FIG. 6B is an enlarged version of the cross section encompassing the gear pump 204 and pump bellhousing 208. FIG. 6A is similar to FIG. 5 but from a different perspective with a cutout based on the vertical midpoint plane 336.

FIG. 6B shows the gear pump 204 contains an upper gear 602a and a lower gear 602b. The upper gear 602a may be coupled to a shaft gear insert 604 and by extension the rotor drive shaft 506. FIG. 6B also shows a pump side rotor shaft bearing 510, a shaft seal 606, a plurality of gear pump bearings 608, and an independent gear 610 that may further aid in supporting the rotor drive shaft 506 and the gears 602a, 602b of the gear pump 204. The independent gear 610 may act as a counter rotational balance to the rotor drive shaft 506.

The rotor drive shaft 506 includes a shaft gear insert 604 that extends out past the pump side rotor shaft bearing 510 and shaft seal 606. The shaft gear insert 604 extends and locks into a coupling cavity 612 in the upper gear 602a of the gear pump 204. The upper gear 602a is configured so the shaft gear insert 604 is coupled directly into the coupling cavity 612 to reduce space. The reduction in space provided by the coupling cavity 612 and shaft gear insert 604 allows for the longitudinal length of the motor and pump unit 200 to be reduced while maintaining a similar longitudinal and/or transversal length for the rotor 502 and stator 504. Maintaining a similar longitudinal and transversal length for the rotor 502 and stator 504 may allow for improved packaging of the motor 202.

In an example, the system lacks other couplings that extend from gear pump 204 and/or the pump bellhousing 208 that may be fastened to the rotor drive shaft 506. The system lacks other couplings that extend from gear pump 204 and/or the pump bellhousing 208 that may be inserted and/or fastened to electric motor 202 immediately around the rotor drive shaft 506. The reduction of components, such as the additional couplings and/or a separate assembly pump shaft from the rotor drive shaft 506, reduces the complexity motor and pump unit 200. Reducing complexity of the coupling between the motor 202 and gear pump 204 reduces degradation of the rotor drive shaft 506 and the coupling.

The coupling between the shaft gear insert 604 and coupling cavity 612 is a male to female connection that may be of a single coupling. The male to female connection may be simpler and larger encompassing the majority of the shaft gear insert 604 and coupling cavity 612 between the shaft gear insert 604 and the coupling cavity 612, thereby reducing the number of moving parts. The coupling may also provide greater support of the rotor drive shaft 506, as well support for the gears 602a, 602b of the gear pump 204. The shaft gear insert 604 and coupling cavity 612 may reduce space within the motor and pump unit 200, as much of the volume used for coupling is within the upper gear 602a. The reduction of space may allow the motor and pump unit 200 have a decreased longitudinal length.

The upper gear 602a and lower gear 602b of the gear pump 204, may be supported by a plurality of gear pump bearings 608. The gear pump bearings 608 are smooth ring like structure that encircle and support the gears 602a, 602b. A gear pump bearing 608 may have a smooth outer bracing element and an inner roller element. The inner roller element may include small spheres or ball bearings lining the inner ring of the gear pump bearing 608. The inner roller element allows the gears 602a, 602b to rotate with case while the gear pump 204 is pumping.

The shaft seal 606 surrounds the rotor drive shaft 506 as it transitions into the shaft gear insert 604. The shaft seal 606 prevents hydraulic fluid 116 from seeping into the electric motor 202 from the gear pump 204. The shaft seal 606 prevents moister from entering the electric motor 202 from the interior and exterior of the pump. In certain embodiments, the shaft seal 606 may be for example an O-ring. However, other embodiments of the shaft seal 606 are possible and have been considered, such as wiper seals, etc.

As the rotor 502 of the electric motor 202 rotates, the rotor drive shaft 506 spins around the axis of rotation 230. The shaft gear insert 604 spins substantially with the rotor drive shaft 506. The upper gear 602a coupled to the shaft gear insert 604 is forced rotate as the rotor 502 spins. The teeth of the upper gear 602a and the teeth of the lower gear 602b may be interlocked with one another. The interlocking of the gear teeth forces the lower gear 602b to rotate with the upper gear 602a. Mechanical energy from the rotation of the rotor drive shaft 506 may be transferred into the gears 602a, 602b of the gear pump 204. The pressure of the hydraulic fluid 116 may be raised via the gears 602a, 602b. As hydraulic fluid 116 is drawn into the gear pump 204 and driven between the gears 602a, 602b, some of the mechanical energy may be transferred into the hydraulic fluid 116. The addition of mechanical energy and forced flow through a smaller channel (e.g., the hydraulic outlet channel 524) may increase the pressure of the hydraulic fluid 116 and creates a pressure differential across the gear pump 204. The gear pump 204 may continuously expel hydraulic fluid 116 into the outlet hydraulic line 528 at a higher pressure if the electric motor 202 is running.

The figures show an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In an example, an extension from the rotor drive shaft may be used that inserts into a cavity within the upper gear of the gear pump. The extension from the rotor drive shaft may be coupled within the cavity of the upper gear of the gear pump. This allows the upper gear of the gear pump to be directly couple directly to the shaft of the motor and reduce The space. For one example, the motor may be reduced in a longitudinal length. Alternatively, for a given package, the motor length may be increased to increase motor output.

As used herein, the term "approximately" is construed to mean plus or minus five percent of the range unless otherwise specified.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an electric motor having a rotor shaft;
a hydraulic pump including a gear; and
an end bell housing enclosing an end of the electric motor, the end bell housing having a plurality of cooling fins, the end bell housing further supporting the gear coupled to the rotor shaft, the gear pressurizing hydraulic fluid and coupled to the rotor shaft via a shaft gear insert inserted into a coupling cavity of the gear, wherein the gear is an upper gear of a pair of gears, wherein the end bell housing is a single, continuous, and monolithic end housing, and an independent gear is configured to support the rotor shaft and the pair of gears, and wherein the independent gear is a counter rotational balance to the rotor shaft.

2. The system of claim 1, wherein the shaft gear insert terminates in the coupling cavity.

3. The system of claim 2, further comprising a pump flange directly coupled to the end bell housing to enclose the hydraulic pump, the pump flange having a hydraulic port to supply the pressurized hydraulic fluid.

4. The system of claim 1, wherein the cooling fins are horizontal and vertically aligned.

5. The system of claim 4, wherein the hydraulic pump includes a second gear vertically below the gear and meshing with the gear to form the pump.

6. The system of claim 3, wherein the flange includes a plurality of longitudinal through holes with connectors coupling the flange to the end bell housing.

7. The system of claim 1, further comprising a motor side mount directly coupled to the end bell housing.

8. The system of claim 1, wherein the end bell housing forms an integrated, unitary, and monolithic closing flange and pump body.

9. The system of claim 1, wherein the end bell housing consists essentially of aluminum.

10. The system of claim 1, wherein the end bell housing does not include hydraulic fluid ducts, and wherein the end bell housing does not include hydraulic fluid ports, the hydraulic pump formed of the gear and a second gear of the pair of gears, the gear and the second gear being the only gears and solely pressurizing hydraulic fluid.

11. A system, comprising:
a vehicle including an electric motor having a rotor shaft, a pair of gears forming a hydraulic pump, and an end bell housing enclosing an end of the electric motor, the end bell housing having a plurality of cooling fins, the end bell housing further supporting the pair of gears, with one of the pair of gears directly coupled to and driven by the rotor shaft, the end bell housing thereby supporting the hydraulic pump, wherein the rotor shaft comprises a shaft gear insert that extends into a coupling cavity of an upper gear of the pair of gears, wherein the end bell housing is a single, continuous, and monolithic end bell housing, and an independent gear is configured to support the rotor shaft and the pair of gears, and wherein the independent gear is a counter rotational balance to the rotor shaft; and
the vehicle further including a hydraulic system with an actuator, the hydraulic system fluidically coupled with the hydraulic pump, the pump generating pressure to drive the actuator.

12. The system of claim 11, further comprising a pump flange directly coupled to the end bell housing to enclose the pump, the pump flange having a hydraulic port.

13. The system of claim 11, wherein the cooling fins are horizontal and vertically aligned.

14. The system of claim 12, wherein the flange includes a plurality of longitudinal through holes with connectors coupling the flange to the end bell housing.

15. The system of claim 14, further comprising a motor side mount directly coupled to the end bell housing.

16. The system of claim 15, wherein the end bell housing forms an integrated, unitary, and monolithic closing flange and pump body.

17. The system of claim 16, wherein the end bell housing consists essentially of aluminum, wherein the end bell housing does not include hydraulic fluid ducts, wherein the end bell housing does not include hydraulic fluid ports, and wherein the motor is mounted longitudinally in a wheeled vehicle.

18. The system of claim 17, wherein one of the pair of gears of the hydraulic pump is positioned vertically below the rotor shaft.

19. A system, comprising:
an electric motor having a rotor shaft;
a pair of gears forming a hydraulic pump; and
an end bell housing with a substantially circular perimeter, the end bell housing enclosing an end of the electric motor, the end bell housing having a plurality of cooling fins, the end bell housing further supporting the pair of gears coupled to a shaft gear insert of the rotor shaft inserted into a coupling cavity of an upper gear of the pair of gears, a lower gear of the pair of gears coupled to an independent gear that is a counter rotational balance to the rotor shaft, the end bell housing supporting the hydraulic pump via bearings coupled in the end bell housing, and the end bell housing closed by a pump flange directly coupled to the end bell housing.

* * * * *